(12) United States Patent
Doi

(10) Patent No.: US 9,280,733 B2
(45) Date of Patent: Mar. 8, 2016

(54) IMAGE INTERPOLATING UNIT, PROGRAM PRODUCT, AND READING APPARATUS THAT INSERTS AN INTERPOLATED PIXEL VALUE IN A LOST PIXEL POSITION BASED ON EDGE AMOUNTS OF REFERENCE PIXELS AND TOTAL OF DIFFERENCES BETWEEN PIXEL VALUES

(71) Applicant: Oki Data Corporation, Tokyo (JP)

(72) Inventor: Toshihiro Doi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/717,838

(22) Filed: May 20, 2015

(65) Prior Publication Data

US 2015/0339555 A1 Nov. 26, 2015

(30) Foreign Application Priority Data

May 23, 2014 (JP) .................................. 2014-106979

(51) Int. Cl.
| | |
|---|---|
| H04N 1/029 | (2006.01) |
| H04N 1/03 | (2006.01) |
| H04N 1/401 | (2006.01) |
| G06K 15/02 | (2006.01) |
| H04N 1/031 | (2006.01) |
| H04N 1/00 | (2006.01) |
| H04N 1/192 | (2006.01) |
| H04N 1/193 | (2006.01) |

(52) U.S. Cl.
CPC ........ *G06K 15/1872* (2013.01); *H04N 1/00068* (2013.01); *H04N 1/0311* (2013.01); *H04N 1/0313* (2013.01); *H04N 1/192* (2013.01); *H04N 1/1934* (2013.01); *H04N 1/401* (2013.01)

(58) Field of Classification Search
None
See application file for complete search history.

(56) References Cited

U.S. PATENT DOCUMENTS

| | | | | | |
|---|---|---|---|---|---|
| 4,870,483 | A * | 9/1989 | Nishigaki | ............... | H04N 9/045 358/483 |
| 7,474,437 | B2 * | 1/2009 | Ishido | .................... | H04N 1/193 358/1.9 |
| 7,738,738 | B2 * | 6/2010 | Yamanaka | ............ | G06T 3/4007 382/300 |
| 8,130,428 | B2 * | 3/2012 | Hamada | ................. | H04N 1/193 358/1.6 |
| 8,248,674 | B2 * | 8/2012 | Kurigata | ................ | H04N 1/193 358/474 |
| 8,405,886 | B2 * | 3/2013 | Kurigata | ................ | H04N 1/053 358/474 |
| 8,553,293 | B2 * | 10/2013 | Tabata | .................. | G06T 3/4007 358/443 |

FOREIGN PATENT DOCUMENTS

JP 2007-251404 A 9/2007

* cited by examiner

*Primary Examiner* — Scott A Rogers
(74) *Attorney, Agent, or Firm* — Rabin & Berdo, P.C.

(57) ABSTRACT

Provided is an image interpolating unit including: a first interpolation pixel generator that generates a first pixel value; a second interpolation pixel generator that detects, based on a total of differences between pixel values in a pixel group centered around a lost pixel and pixel values in pixel groups centered around a single pixel around the lost pixel, reference pixels of the lost pixel, and generate, based on the reference pixels, a second pixel value on the lost pixel; a reference pixel edge amount calculator; and an interpolator that inserts, as an interpolation pixel value, one of the first and the second pixel values into a position corresponding to the lost pixel, based on edge amounts of the reference pixels and a total of differences between pixel values in a pixel group centered around the reference pixels and the pixel values in the pixel group centered around the lost pixel.

8 Claims, 4 Drawing Sheets

IMAGE INTERPOLATING UNIT, PROGRAM PRODUCT, AND READING APPARATUS THAT INSERTS AN INTERPOLATED PIXEL VALUE IN A LOST PIXEL POSITION BASED ON EDGE AMOUNTS OF REFERENCE PIXELS AND TOTAL OF DIFFERENCES BETWEEN PIXEL VALUES

CROSS REFERENCE TO RELATED APPLICATIONS

This application claims the benefit of Japanese Priority Patent Application JP2014-106979 filed on May 23, 2014, the entire contents of which are incorporated herein by reference.

BACKGROUND

The invention relates to an image interpolating unit, a recording medium having an image interpolating program, and an image reading apparatus.

A contact image sensor (CIS) is mounted in an apparatus such as, but not limited to, a scanner, a copying machine, a multi-function peripheral, and a facsimile, and is used for an image reading apparatus that reads an image on a medium. The contact image sensor is an equal-magnification sensor, and thus requires having a length equal to or greater than a width of the medium in order to read the image on the medium. To meet such a requirement, a plurality of contact image sensors are typically coupled together to configure an image reading sensor, as disclosed in Japanese Unexamined Patent Application Publication No. 2007-251404.

SUMMARY

Coupling a plurality of contact image sensors together to perform reading of an image at high resolution narrows an interval between image reading elements provided in each of the contact image sensors, making it difficult to perform reading of pixel data at a region where the contact image sensors are coupled. This may cause a pixel to be lost at a to-be-interpolated pixel position corresponding to the coupled region of the contact image sensors, and may lead to irregularities in periodicity of an image pattern accordingly.

To fill in an image at the coupled region of the contact image sensors as described above, various complex processes may be performed to interpolate a lost image. Such a complex configuration, however, increases a scale of an image processing unit and a unit cost.

What is desired is an image interpolating unit, a recording medium having an image interpolating program, and an image reading apparatus that make it possible to interpolate a lost pixel at a to-be-interpolated pixel position, while reducing a unit cost.

An image interpolating unit according to an embodiment of the invention is configured to perform interpolation of a lost pixel. The lost pixel is located at a region in which a plurality of contact image sensors are coupled, and the contact image sensors are each provided with a plurality of image reading elements that are arrayed in line. The image interpolating unit includes: a first interpolation pixel generator configured to generate, based on linear interpolation, a first pixel value on the lost pixel; a second interpolation pixel generator configured to detect, based on a difference total value, reference pixels of the lost pixel, and generate, based on the reference pixels, a second pixel value on the lost pixel, in which the difference total value is a total of differences between pixel values corresponding to pixels in a pixel group that is centered around the lost pixel and pixel values corresponding to pixels in respective pixel groups that are centered around a single pixel around the lost pixel; a reference pixel edge amount calculator configured to calculate edge amounts of the reference pixels; and an interpolator configured to insert, as an interpolation pixel value, one of the first pixel value and the second pixel value into a position corresponding to the lost pixel, based on the edge amounts of the reference pixels and a difference total value, in which the difference total value is a total of differences between pixel values corresponding to pixels in a pixel group that is centered around the reference pixels and the pixel values corresponding to the pixels in the pixel group that is centered around the lost pixel.

A recording medium according to an embodiment of the invention has a machine-readable program embodied therein. The program causes, when executed by a machine, the machine to function as an image interpolating unit. The image interpolating unit is configured to perform interpolation of a lost pixel. The lost pixel is located at a region in which a plurality of contact image sensors are coupled, and the contact image sensors are each provided with a plurality of image reading elements that are arrayed in line. The image interpolating unit includes: a first interpolation pixel generator configured to generate, based on linear interpolation, a first pixel value on the lost pixel; a second interpolation pixel generator configured to detect, based on a difference total value, reference pixels of the lost pixel, and generate, based on the reference pixels, a second pixel value on the lost pixel, in which the difference total value is a total of differences between pixel values corresponding to pixels in a pixel group that is centered around the lost pixel and pixel values corresponding to pixels in respective pixel groups that are centered around a single pixel around the lost pixel; a reference pixel edge amount calculator configured to calculate edge amounts of the reference pixels; and an interpolator configured to insert, as an interpolation pixel value, one of the first pixel value and the second pixel value into a position corresponding to the lost pixel, based on the edge amounts of the reference pixels and a difference total value, in which the difference total value is a total of differences between pixel values corresponding to pixels in a pixel group that is centered around the reference pixels and the pixel values corresponding to the pixels in the pixel group that is centered around the lost pixel.

An image reading apparatus according to an embodiment of the invention is provided with an image interpolating unit. The image interpolating unit is configured to perform interpolation of a lost pixel. The lost pixel is located at a region in which a plurality of contact image sensors are coupled. The contact image sensors are each provided with a plurality of image reading elements that are arrayed in line. The image interpolating unit performs the interpolation, based on pixel values read by the image reading elements. The image interpolating unit includes: a first interpolation pixel generator configured to generate, based on linear interpolation, a first pixel value on the lost pixel; a second interpolation pixel generator configured to detect, based on a difference total value, reference pixels of the lost pixel, and generate, based on the reference pixels, a second pixel value on the lost pixel, in which the difference total value is a total of differences between pixel values corresponding to pixels in a pixel group that is centered around the lost pixel and pixel values corresponding to pixels in respective pixel groups that are centered around a single pixel around the lost pixel; a reference pixel edge amount calculator configured to calculate edge amounts of the reference pixels; and an interpolator configured to insert, as an interpolation pixel value, one of the first pixel value and the second pixel value into a position corresponding to the lost pixel, based on the edge amounts of the reference pixels and a difference total value, in which the difference total value is a total of differences between pixel values corresponding to pixels in a pixel group that is centered around the reference pixels and the pixel values corresponding to the pixels in the pixel group that is centered around the lost pixel.

The image interpolating unit, the recording medium having the image interpolating program, and the image reading apparatus according to the respective embodiments of the invention described above make it possible to interpolate the lost pixel while reducing a unit cost.

It is to be understood that both the foregoing general description and the following detailed description are exemplary, and are intended to provide further explanation of the invention as claimed. Also, effects of the invention are not limited to those described above. Effects achieved by the invention may be those that are different from the above-described effects, or may include other effects in addition to those described above.

DETAILED DESCRIPTION

A. Example Embodiment

In the following, an image interpolating unit, a recording medium having an image interpolating program, and an image reading apparatus according to an example embodiment of the invention are described in detail with reference to the accompanying drawings.

[A-1. Configuration in Example Embodiment]

Figure 1:
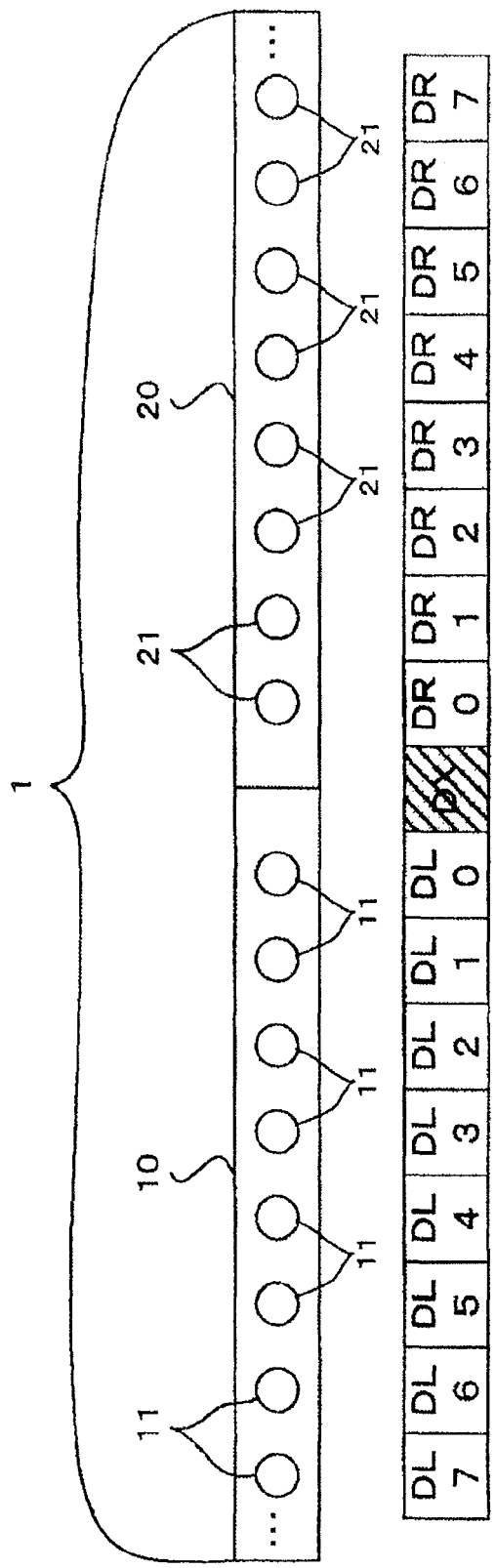
FIG. 1 illustrates an example of a configuration of an image reading sensor according to an example embodiment.

FIG. 1 illustrates an example of a configuration of an image reading sensor according to an example embodiment. Referring to FIG. 1, an image reading sensor 1 according to the example embodiment includes a plurality of contact image sensors (CISs) 10 and 20. FIG. 1 illustrates one example in which two contact image sensors 10 and 20 are provided.

The image reading sensor 1 has a configuration in which the plurality of contact image sensors 10 and 20 are coupled together. Although FIG. 1 illustrates one example in which the image reading sensor 1 includes two contact image sensors 10 and 20, the image reading sensor 1 may have a configuration in which three or more contact image sensors are coupled together.

The contact image sensors 10 and 20 have a plurality of image reading elements 11 and 21, respectively. The image reading elements 11 and 21 may be arrayed in line at even intervals, and each may be, for example but not limited to, a CMOS sensor. The contact image sensors 10 and 20 read an image with use of a light source such as, but not limited to, LED. For the purpose of easier description, a description is given here of the example embodiment by referring to one example in which the contact image sensors 10 and 20 have eight image reading elements 11 and 21, respectively. However, the number of image reading elements 11 and 21 provided in the respective contact image sensors 10 and 20 are not particularly limited.

As illustrated in FIG. 1, pieces of read image data that are read by the respective image reading elements 11 in the contact image sensor 10 are defined as DL7, DL6, DL5, . . . , and DL0. Also, pieces of read image data that are read by the respective image reading elements 21 in the contact image sensor 20 are defined as DR0, DR1, DR2, . . . , and DR7, as illustrated in FIG. 1. A pixel corresponding to a region in which the contact image sensor 10 and the contact image sensor 20 are coupled together is a to-be-interpolated pixel (i.e., a pixel to be subjected to interpolation) or a "lost pixel", and pixel data corresponding to the to-be-interpolated pixel is defined as DX.

The image reading sensor 1 supplies a later-described image interpolating unit 100 with the pieces of read image data (may also be referred to as "pixel data" hereinafter) that are read by the respective image reading elements 11 and 21 provided respectively in the contact image sensors 10 and 20. The image reading sensor 1 may output, to the image interpolating unit 100, the pieces of read image data derived from the respective image reading elements 11 and 21 in order of DL7, DL6, . . . , DL0, DR0, . . . , DR6, and DR7. Note that a description is given here of the example embodiment by referring to one example in which the pieces of pixel data are outputted in order from the image reading element 11 on the left side of the contact image sensor 10 toward the right side in the image reading sensor 1 as illustrated in FIG. 1, although order of output of the pieces of pixel data is not limited thereto.

Figure 2:
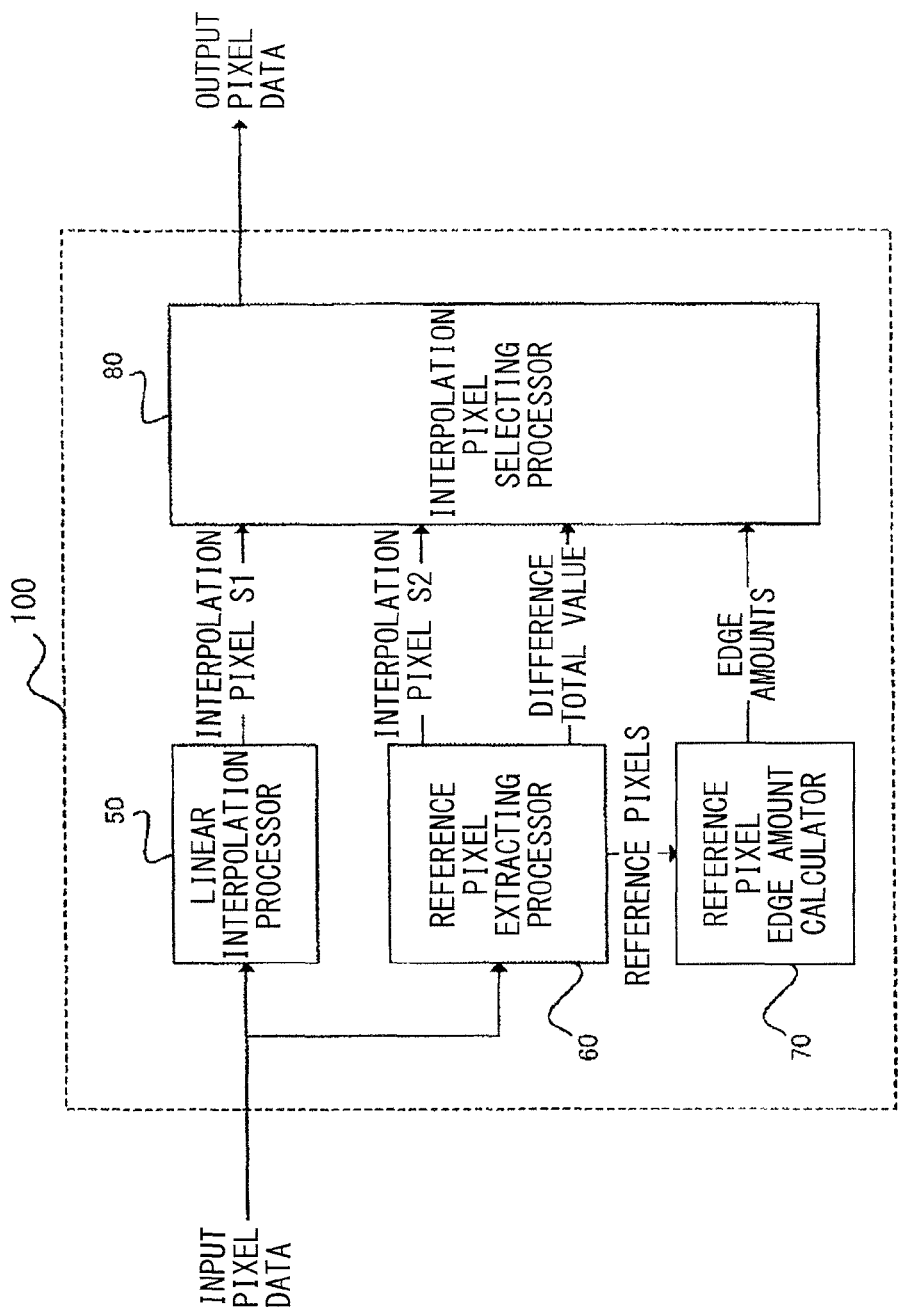
FIG. 2 illustrates an example of an internal configuration of an image interpolating unit according to the example embodiment.

FIG. 2 illustrates an example of an internal configuration of the image interpolating unit 100 according to the example embodiment. The image interpolating unit 100 according to the example embodiment includes a linear interpolation processor 50, a reference pixel extracting processor 60, a reference pixel edge amount calculator 70, and an interpolation pixel selecting processor 80.

In one embodiment of the invention, the linear interpolation processor 50 corresponds to a concrete but non-limiting example of a "first interpolation pixel generator". Also, the reference pixel extracting processor 60 corresponds to a concrete but non-limiting example of a "second interpolation pixel generator", and a reference pixel edge amount calculator 70 corresponds to a concrete but non-limiting example of a "reference pixel edge amount calculator".

The image interpolating unit 100 receives the pieces of pixel data (hereinafter may be referred to as "pixel values") from the image reading sensor 1, and performs an interpolation process of a read image, based on the received pieces of pixel data. Also, the image interpolating unit 100 may output the pieces of pixel data subjected to the interpolation process to a succeeding image processing unit.

The image interpolating unit 100 may have, in advance, information on positions of the respective image reading elements 11 and 21 and on intervals therebetween in the image reading sensor 1. The image interpolating unit 100 may include devices such as, but not limited to, CPU, RAM, ROM, EEPROM, and an input-output interface. The image interpolating unit 100 may also be achieved by causing CPU to execute an image interpolating program stored in a recording medium such as, but not limited to, ROM. The image interpolating program may be installed on a machine or a computer to achieve functions of the image interpolating unit 100. Even in such an embodiment, the image interpolating program is represented as illustrated in FIG. 2 and in later-described FIG. 3.

The linear interpolation processor 50 receives the pieces of pixel data outputted from the image reading sensor 1, and outputs average data as an interpolation pixel S1 to the interpolation pixel selecting processor 80. The average data is an average of the pieces of pixel data corresponding to the respective pixels located on both sides of the lost pixel in the received pieces of pixel data. In one embodiment of the invention, the interpolation pixel S1 corresponds to a concrete but non-limiting example of a "first pixel value".

In other words, the linear interpolation processor 50 performs an averaging process, based on the pixel data DL0 outputted from the image reading element 11 located on the right side of the contact image sensor 10 coupled to the contact image sensor 20, and based on the pixel data DR0 outputted from the image reading element 21 located on the left side of the contact image sensor 20 coupled to the contact image sensor 10.

The following is an example of the averaging process of the pieces of pixel data DL0 and DR0 performed by the linear interpolation processor 50. The linear interpolation processor 50 uses the pieces of pixel data DL0 and DR0 as the pieces of pixel data corresponding to the respective pixels located on the both sides of the lost pixel, to calculate the average data of those pieces of pixel data in accordance with the following expression (1).

$$\text{(Interpolation pixel } S1) = (DL0 + DR0)/2 \qquad (1)$$

The reference pixel extracting processor 60 receives the pieces of pixel data outputted from the image reading sensor 1, and determines reference pixels, an interpolation pixel S2, and difference total values, based on the received pieces of pixel data. The reference pixel extracting processor 60 outputs the determined reference pixels to the reference pixel edge amount calculator 70. In one embodiment of the invention, the interpolation pixel S2 corresponds to a concrete but non-limiting example of a "second pixel value".

Further, the reference pixel extracting processor 60 supplies the interpolation pixel selecting processor 80 with the interpolation pixel S2 and the difference total values.

Figure 3:
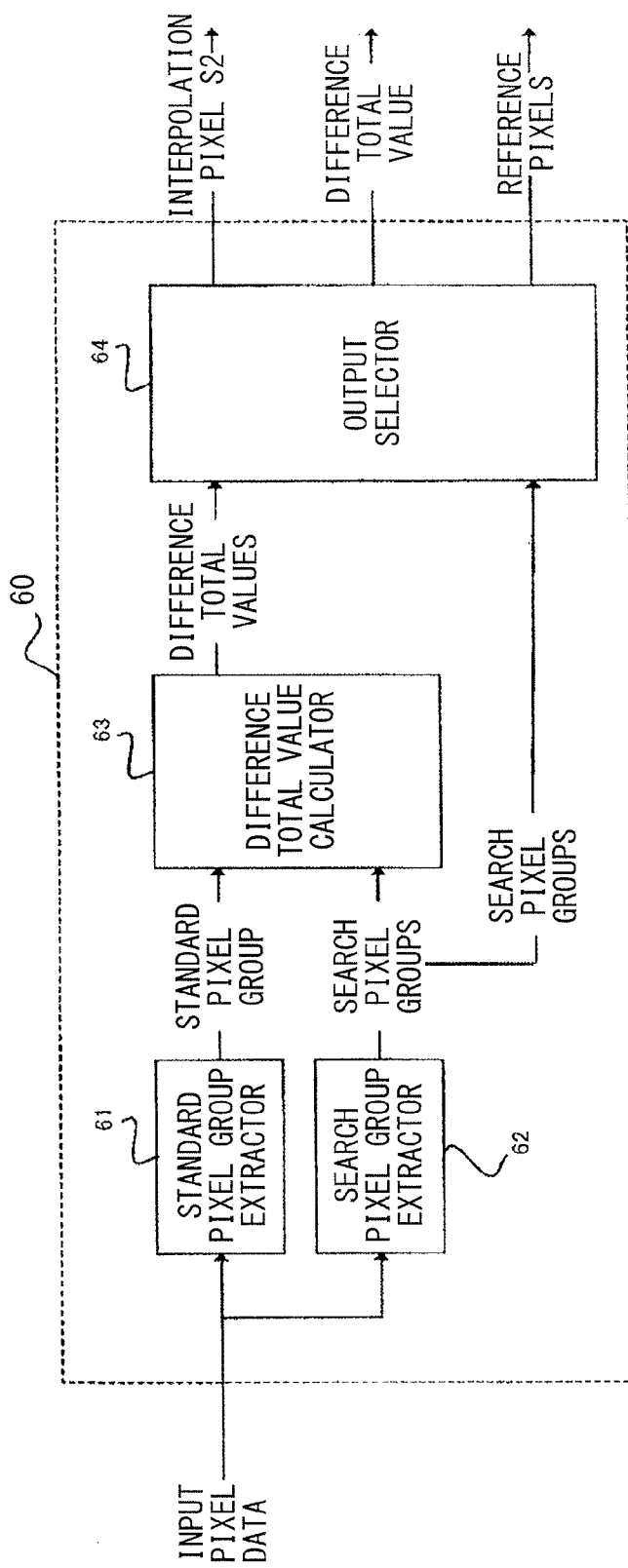
FIG. 3 illustrates an example of a configuration of a reference pixel extracting processor according to the example embodiment.

FIG. 3 illustrates an example of a configuration of the reference pixel extracting processor 60 according to the example embodiment. Referring to FIG. 3, the reference pixel extracting processor 60 may include a standard pixel group extractor 61, a search pixel group extractor 62, a difference total value calculator 63, and an output selector 64.

The standard pixel group extractor 61 extracts, as a standard pixel group, the pieces of pixel data corresponding to respective four pixels that are adjacent to the lost pixel on the left and right sides of the lost pixel, based on the pieces of pixel data received from the image reading sensor 1. Further, the standard pixel group extractor 61 outputs the pieces of pixel data corresponding to the extracted standard pixel group to the difference total value calculator 63. In one example illustrated in FIG. 1, the standard pixel group extractor 61 may extract four pieces of pixel data DL1, DL0, DR0, and DR1 as the pieces of pixel data corresponding to the four pixels adjacent to the lost pixel on the left and right sides thereof, and output the thus-extracted four pieces of pixel data DL1, DL0, DR0, and DR1 to the difference total value calculator 63.

The search pixel group extractor 62 extracts, as search pixel groups, pieces of pixel data, each corresponding to five successive pixels, from the pieces of pixel data that correspond to pixels located in a predetermined range around the lost pixel, based on the pieces of pixel data received from the image reading sensor 1. Further, the search pixel group extractor 62 outputs, as the search pixel groups, the extracted pieces of pixel data to the difference total value calculator 63 and the output selector 64.

In one example illustrated in FIG. 1, the search pixel group extractor 62 extracts, as the search pixel groups, the pieces of pixel data (DL7, DL6, DL5, DL4, and DL3), the pieces of pixel data (DL6, DL5, DL4, DL3, and DL2), the pieces of pixel data (DL5, DL4, DL3, DL2, and DL1), the pieces of pixel data (DL4, DL3, DL2, DL1, and DL0), the pieces of pixel data (DR0, DR1, DR2, DR3, and DR4), the pieces of pixel data (DR1, DR2, DR3, DR4, and DR5), the pieces of pixel data (DR2, DR3, DR4, DR5, and DR6), and the pieces of pixel data (DR3, DR4, DR5, DR6, and DR7).

More specifically, the search pixel group extractor 62 extracts the plurality of search pixel groups that are centered around a single pixel that is around the lost pixel DX. In one example, the single pixel around the lost pixel may be DL5, DL4, DL3, DL2, DR2, DR3, DR4, or DR5. In other words, the search pixel group extractor 62 extracts the following search pixel groups that are centered around the single pixel, i.e., DL(n):

Search pixel group centered around DL(5)=(DL7, DL6, DL5, DL4, DL3);

Search pixel group centered around DL(4)=(DL6, DL5, DL4, DL3, DL2);

Search pixel group centered around DL(3)=(DL5, DL4, DL3, DL2, DL1); and

Search pixel group centered around DL(2)=(DL4, DL3, DL2, DL1, DL0).

The search pixel group extractor 62 further extracts the following search pixel groups that are centered around the single pixel, i.e., DR(n):

Search pixel group centered around DR(2)=(DR0, DR1, DR2, DR3, DR4);

Search pixel group centered around DR(3)=(DR1, DR2, DR3, DR4, DR5);

Search pixel group centered around DR(4)=(DR2, DR3, DR4, DR5, DR6); and

Search pixel group centered around DR(5)=(DR3, DR4, DR5, DR6, DR7).

In the present example embodiment, the predetermined range around the lost pixel ranges from DL7 of the contact image sensor 10 to DR7 of the contact image sensor 20 as illustrated by way of example in FIG. 1. However, any range in the contact image sensors 10 and 20 may be determined as the predetermined range around the lost pixel on an as-needed basis.

The difference total value calculator 63 calculates difference total values, based on the standard pixel group and the search pixel groups received from the image reading sensor 1, and outputs the calculated difference total values to the output selector 64. The difference total values are each a total of absolute values of respective differences between the corresponding pieces of pixel data in the respective standard pixel group and search pixel group.

In one example where the difference total value calculator 63 receives the pieces of pixel data (DL1, DL0, DR0, and DR1) as the standard pixel group and receives the pieces of pixel data (DL7, DL6, DL5, DL4, and DL3), (DL6, DL5, DL4, DL3, and DL2), (DL5, DL4, DL3, DL2, and DL1), (DL4, DL3, DL2, DL1, and DL0), (DR0, DR1, DR2, DR3, and DR4), (DR1, DR2, DR3, DR4, and DR5), (DR2, DR3, DR4, DR5, and DR6), and (DR3, DR4, DR5, DR6, and DR7) as the search pixel groups as described above, the difference total value calculator 63 outputs values calculated from the following expressions (2) and (3) as the difference total values, where abs( ) in the expressions (2) and (3) denotes an absolute value.

For example, any difference total value of the search pixel group centered around the pixel data DL(n) may be calculated according to the expression (2).

(Difference total value of search pixel group centered around pixel data $DL(n)$)=abs($DL1-DL(n-2)$)+ abs($DL0-DL(n-1)$)+abs($DR0-DL(n+1)$)+abs ($DR1-DL(n+2)$)     (2)

More specifically, the difference total value calculator 63 calculates the absolute values of the differences, excluding the middle pixel, between the standard pixel group and the plurality of search pixel groups, and adds the thus-calculated absolute values to obtain the total values for the respective standard pixel group and search pixel groups. In other words, the difference total value calculator 63 calculates the following difference total values of the respective search pixel groups that are centered around DL(n), and outputs the calculated difference total values:

(Difference total value of search pixel group centered around $DL(5)$)=abs($DL1-DL7$)+abs($DL0-DL6$)+ abs($DR0-DL4$)+abs($DR1-DL3$);

(Difference total value of search pixel group centered around $DL(4)$)=abs($DL1-DL6$)+abs($DL0-DL5$)+ abs($DR0-DL3$)+abs($DR1-DL2$);

(Difference total value of search pixel group centered around $DL(3)$)=abs($DL1-DL5$)+abs($DL0-DL4$)+ abs($DR0-DL2$)+abs($DR1-DL1$); and (Difference total value of search pixel group centered around $DL(2)$)=abs($DL1-DL4$)+abs($DL0-DL3$)+ abs($DR0-DL1$)+abs($DR1-DL0$).

Also, for example, any difference total value of the search pixel group centered around the pixel data DR(n) may be calculated according to the expression (3).

(Difference total value of search pixel group centered around pixel data $DR(n)$)=abs($DL1-DR(n-2)$)+ abs($DL0-DR(n-1)$)+abs($DR0-DR(n+1)$)+abs ($DR1-DR(n+2)$)     (3)

More specifically, the difference total value calculator 63 calculates the absolute values of the differences, excluding the middle pixel, between the standard pixel group and the plurality of search pixel groups, and adds the thus-calculated absolute values to obtain the total values for the respective standard pixel group and search pixel groups. In other words, the difference total value calculator 63 further calculates the following difference total values of the respective search pixel groups that are centered around DR(n), and outputs the calculated difference total values:

(Difference total value of search pixel group centered around $DR(2)$)=abs($DL1-DR0$)+abs($DL0-DR1$)+ abs($DR0-DR3$)+abs($DR1-DR4$);

(Difference total value of search pixel group centered around $DR(3)$)=abs($DL1-DR1$)+abs($DL0-DR2$)+ abs($DR0-DR4$)+abs($DR1-DR5$);

(Difference total value of search pixel group centered around $DR(4)$)=abs($DL1-DR2$)+abs($DL0-DR3$)+ abs($DR0-DR5$)+abs($DR1-DR6$); and (Difference total value of search pixel group centered around $DR(5)$)=abs($DL1-DR3$)+abs($DL0-DR4$)+ abs($DR0-DR6$)+abs($DR1-DR7$).

The output selector 64 receives the search pixel groups from the search pixel group extractor 62 and the difference total values from the difference total value calculator 63, and outputs, as the interpolation pixel S2, the pixel data to the interpolation pixel selecting processor 80. The pixel data outputted by the output selector 64 corresponds to the pixel located in the middle of the search pixel group that is the smallest in the difference total value among the received difference total values. Further, the output selector 64 outputs the smallest difference total value to the interpolation pixel selecting processor 80.

Also, as the reference pixels, the output selector 64 outputs, to the reference pixel edge amount calculator 70, the pixel data corresponding to the pixel located in the middle of the search pixel group that has the smallest difference total value, and the pieces of pixel data corresponding to the respective two pixels that are adjacent to that pixel located in the middle.

For example, if the search pixel group (DL4, DL3, DL2, DL1, and DL0) is the smallest in the difference total value among the received pieces of pixel data in one example illustrated in FIG. 1, the output selector 64 outputs, as the interpolation pixel S2, the pixel data DL2 that corresponds to the pixel located in the middle of that search pixel group, and outputs the pieces of pixel data (DL3, DL2, and DL1) as the reference pixels.

The reference pixel edge amount calculator 70 calculates edge amounts of the received reference pixels, and outputs the calculated edge amounts to the interpolation pixel selecting processor 80.

The edge amounts calculated by the reference pixel edge amount calculator 70 are absolute values of respective difference values between the pixel data corresponding to the pixel located in the middle of the reference pixels and each of the pieces of pixel data corresponding to the respective pixels that are adjacent to that pixel located in the middle.

For example, if the reference pixel edge amount calculator 70 receives the pieces of pixel data (DL3, DL2, and DL1) as the reference pixels, the reference pixel edge amount calculator 70 calculates the edge amounts according to the following expressions (4) and (5).

(Edge amount 1)=abs($DL2-DL3$)     (4)

(Edge amount 2)=abs($DL2-DL1$)     (5)

The interpolation pixel selecting processor 80 determines the pixel data corresponding to one of the received interpolation pixel S1 and interpolation pixel S2 as the interpolation pixel, based on the received difference total value and edge amounts. Further, the interpolation pixel selecting processor 80 inserts the determined interpolation pixel into the lost pixel DX. Then, the interpolation pixel selecting processor 80 may perform output of output pixels.

For example, the interpolation pixel selecting processor 80 may have, in advance, a threshold value for evaluation of the difference total value and a threshold value for evaluation of the edge amounts. The interpolation pixel selecting processor 80 may evaluate the difference total value with the predetermined threshold value and evaluate the edge amounts with the predetermined threshold value to determine the pixel to be outputted, based on those evaluation results.

In other words, the interpolation pixel selecting processor 80 may perform the evaluation of the difference total value and the edge amounts with their respective predetermined threshold values. When the difference total value is equal to or less than the predetermined threshold value and the edge amounts are greater than the predetermined threshold value, the interpolation pixel selecting processor 80 may determine the received interpolation pixel S2 as the pixel to be outputted to perform output of the output pixels. Otherwise, the interpolation pixel selecting processor 80 may determine the received interpolation pixel S1 as the pixel to be outputted to perform output of the output pixels.

More specifically, the interpolation pixel selecting processor 80 may determine the interpolation pixel S2 as the pixel to be outputted, when:
(a) the smallest difference total value outputted from the output selector 64 is equal to or less than a threshold value that evaluates the smallest difference total value and the edge amount 1 is greater than a threshold value that evaluates the edge amount 1; or
(b) the smallest difference total value outputted from the output selector 64 is equal to or less than the threshold value and the edge amount 2 is greater than a threshold value that evaluates the edge amount 2.

The interpolation pixel selecting processor 80 may determine the interpolation pixel S1 as the pixel to be outputted, when both of the (a) and the (b) are unsatisfied.

In the present example embodiment, it is possible for the interpolation pixel selecting processor 80 to select the interpolation pixel (or the pixel to be outputted) on the basis of only the difference total value, without performing complex processes that involve division including, without limitation, a complicated pattern matching upon selecting the interpolation pixel S2. Eliminating the use of division may allow for selection of the interpolation pixel, even for pixels in a region in the vicinity of the lost pixel and in which a change in pixel values is moderate. In this regard, because the interpolation pixel selecting processor 80 may utilize the evaluation on the edge amounts of the reference pixels for the final output selection of the pixel, it is possible to allow the selection of the interpolation pixel among the pixels, which are in a region in the vicinity of the lost pixel and in which the change in pixel values is moderate, to be limited only to pixels in a region in which the change in edge amounts is large. Also, because the interpolation pixel selecting processor 80 may utilize the evaluation on the edge amounts of the above-described reference pixels for the final output selection of the pixel, it is possible to perform interpolation of an image without being influenced by the irregularities in periodicity of an image pattern at a region in which the contact image sensors 10 and 20 are coupled together.

Note that, in the present example embodiment, the interpolation pixel selecting processor 80 selects one of the interpolation pixel S1 and the interpolation pixel S2 as the pixel to be outputted and performs output of the output pixels. In an alternative embodiment, the interpolation pixel selecting processor 80 may perform weighting of the interpolation pixel S1 and the interpolation pixel S2 with use of the edge amounts, the difference total value, or a combination thereof, and output the interpolation pixels S1 and S2 subjected to the weighting.

[A-2. Operation in Example Embodiment]

A description is given next of an image interpolation process performed by the image interpolating unit 100 according to the example embodiment.

Figure 4A:
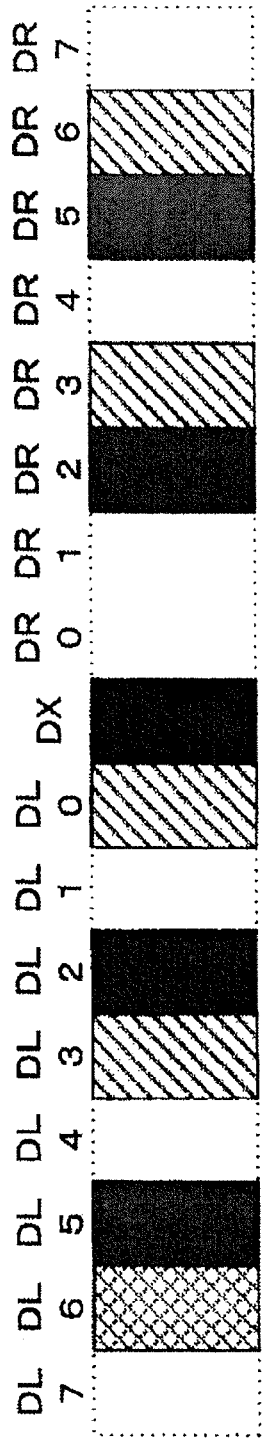
FIGS. 4A to 4C each describe an example of an image interpolation process performed by the image interpolating unit according to the example embodiment.
Figure 4B:
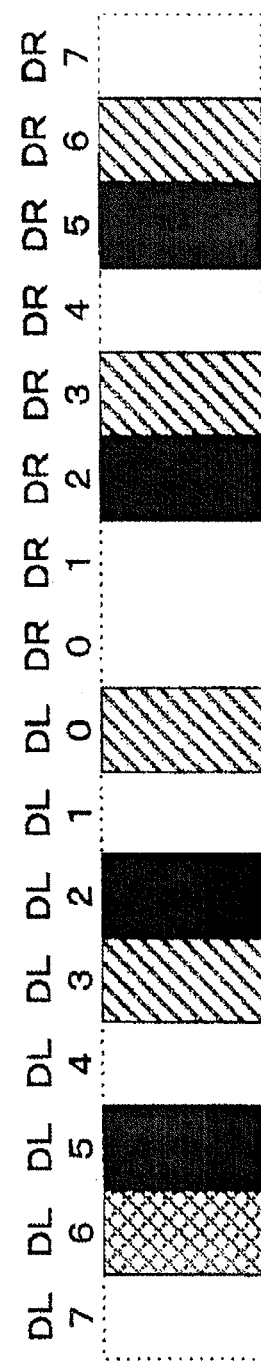
Figure 4C:
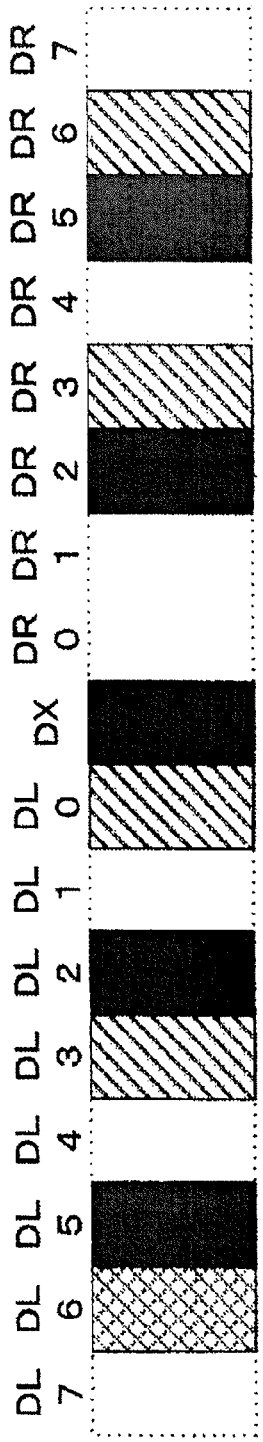

FIGS. 4A to 4C each describe an example of the image interpolation process performed by the image interpolating unit 100 according to the example embodiment.

The image reading sensor 1 reads an image, and inputs the read image data (i.e., the pixel data) of the image into the image interpolating unit 100.

FIG. 4A illustrates the pieces of pixel data upon reading of the image by the image reading sensor 1. Referring to FIG. 4A, the pixel data DX located in the middle of the pieces of pixel data DL7 to DR7 corresponds to the pixel located at the region in which the contact image sensors 10 and 20 are coupled together, and corresponds to the lost pixel that is lost upon reading of the image by the image reading sensor 1.

As described above, the pieces of pixel data derived from the image reading sensor 1 may be inputted into the image interpolating unit 100 in the order of DL7, DL6, ..., DL0, DR0, ..., DR6, and DR7. FIG. 4B illustrates the pieces of pixel data inputted into the image interpolating unit 100. Referring to FIG. 4B, the pixel data corresponding to the lost pixel is lost among the pieces of pixel data inputted into the image interpolating unit 100, causing the irregularities in periodicity of the image pattern at the position in which the lost pixel has occurred.

In the image interpolating unit 100, the linear interpolation processor 50 performs, based on the pixel data DL0 and the pixel data DR0 that corresponds to the respective pixels located on the both sides of the lost pixel DX, the averaging process to calculate the interpolation pixel S1, and supplies the interpolation pixel selecting processor 80 with the calculated interpolation pixel S1.

In the reference pixel extracting processor 60, the standard pixel group extractor 61 extracts, as the standard pixel group, the pieces of pixel data corresponding to the respective four pixels (i.e., the pieces of pixel data DL1, DL0, DR0, and DR1) that are adjacent to the lost pixel DX on the left and right sides of the lost pixel DX, based on the received pieces of pixel data. The standard pixel group extractor 61 supplies the difference total value calculator 63 with the pieces of pixel data corresponding to the extracted standard pixel group.

Also, in the reference pixel extracting processor 60, the search pixel group extractor 62 extracts, as the search pixel groups, the pieces of pixel data, each corresponding to the five successive pixels, from the pieces of pixel data that correspond to pixels located in the predetermined range around the lost pixel DX, based on the received pieces of pixel data. The search pixel group extractor 62 then outputs, as the search pixel groups, the extracted pieces of pixel data to the difference total value calculator 63 and the output selector 64.

For example, the search pixel group extractor 62 extracts, as the search pixel groups, the pieces of pixel data (DL7, DL6, DL5, DL4, and DL3), (DL6, DL5, DL4, DL3, and DL2), (DL5, DL4, DL3, DL2, and DL1), (DL4, DL3, DL2, DL1, and DL0), (DR0, DR1, DR2, DR3, and DR4), (DR1, DR2, DR3, DR4, and DR5), (DR2, DR3, DR4, DR5, and DR6), and (DR3, DR4, DR5, DR6, and DR7).

Further, in the reference pixel extracting processor 60, the difference total value calculator 63 calculates the difference total values each of which is the total of the absolute values of the respective differences between the corresponding pieces of pixel data in the respective standard pixel group and search pixel group, and outputs the calculated difference total values to the output selector 64.

The output selector 64 outputs, to the interpolation pixel selecting processor 80, the interpolation pixel S2 as the pixel data corresponding to the pixel located in the middle of the search pixel group that is the smallest in the difference total value among the received difference total values, as well as the smallest difference total value. Also, as the reference pixels, the output selector 64 outputs, to the reference pixel edge amount calculator 70, the pixel data corresponding to the pixel located in the middle of the search pixel group that has the smallest difference total value, and the pieces of pixel data corresponding to the respective two pixels that are adjacent to that pixel located in the middle.

The reference pixel edge amount calculator 70 calculates the edge amounts of the received reference pixels (the pieces of pixel data DL3, DL2, and DL1), and outputs the calculated edge amounts to the interpolation pixel selecting processor 80.

The interpolation pixel selecting processor 80 may evaluate the difference total value with the predetermined threshold value and evaluate the edge amounts with the predetermined threshold value to select one of the interpolation pixel S1 and the interpolation pixel S2, based on those evaluation results. Then, the interpolation pixel selecting processor 80 may determine the selected one of the interpolation pixels S1 and S2 as the pixel to be outputted, and perform output of the output pixels. For example, in the present example embodiment, the interpolation pixel selecting processor 80 may select the interpolation pixel S2 as the pixel to be outputted and perform output of the output pixels, when the received difference total value is equal to or less than the predetermined threshold value and the received edge amounts are greater than the predetermined threshold value.

More specifically, the interpolation pixel selecting processor 80 may determine the interpolation pixel S2 as the pixel to be outputted when one of the following (a) and (b) is satisfied, and may determine the interpolation pixel S1 as the pixel to be outputted when both of the (a) and the (b) are unsatisfied:

(a) the smallest difference total value outputted from the output selector 64 is equal to or less than a threshold value that evaluates the smallest difference total value and the edge amount 1 is greater than a threshold value that evaluates the edge amount 1; and (b) the smallest difference total value outputted from the output selector 64 is equal to or less than the threshold value and the edge amount 2 is greater than a threshold value that evaluates the edge amount 2.

FIG. 4C illustrates the image data in which the lost pixel DX is interpolated by the image interpolating unit 100. Referring to FIG. 4C, the pixel data outputted from the image interpolating unit 100 is inserted at the position corresponding to the lost pixel DX, making it possible to perform interpolation of a portion corresponding to the lost pixel DX.

[A-3. Example Effect of Embodiment]

For example, the foregoing example embodiment eliminates the need to include a configuration adapted to distinguish a halftone region and a configuration adapted to perform calculation such as, but not limited to, division and multiplication in a pattern matching process, making it possible to reduce a scale of an image processing unit and a cost.

Also, the foregoing example embodiment allows for switching over of the pieces of interpolation pixel data on the pixel position that corresponds to the coupled region of the contact image sensors, based on the edge amounts of the respective reference pixels. Hence, it is possible to perform the interpolation without being influenced by the irregularities in periodicity of the image pattern resulting from the lost pixel at the to-be-interpolated pixel position.

B. Other Embodiments

Although the invention has been described in the foregoing by way of example with reference to the example embodiment and its various modified embodiments as described above, the invention is not limited thereto but may be modified in a wide variety of ways as described below as some modified embodiments.

[B-1]

Any of the example embodiment and its various modified embodiments as described above may be applied widely to any image reading apparatus. Non-limiting examples of the image reading apparatus may include a scanner, a copying machine, a multi-function peripheral, and a facsimile.

[B-2]

The image interpolating unit described in any of the example embodiment and its various modified embodiments as described above extracts four pieces of pixel data as the standard pixel group and extracts five pieces of pixel data for each of the search pixel groups. However, the number of pieces of pixel data belonging to each of the standard pixel group and the search pixel groups is non-limiting. For example, six or more pieces of pixel data may be extracted as the standard pixel group, and seven or more pieces of pixel data may be extracted for each of the search pixel groups.

[B-3]

In each of the example embodiment and its various modified embodiments as described above, the search pixel groups each correspond to a range around the lost pixel. Further, the range covering seven pixels on each of the left and right sides around the lost pixel is described as a range for the extraction of the search pixel groups. However, the range of each of the search pixel groups is non-limiting. For example, the search pixel groups each may correspond to a range that covers eight or more pixels, or six or less pixels, on the left and right sides around the lost pixel. The range for the extraction of the search pixel groups may be widened to address reading of a high-definition image by the image reading sensor, in consideration of such high-definition image reading which narrows an arrangement interval between the image reading elements mounted in the contact image sensors.

Furthermore, the invention encompasses any possible combination of some or all of the various embodiments and the modified embodiments described herein and incorporated herein.

It is possible to achieve at least the following configurations from the above-described example embodiments of the invention.

(1) An image interpolating unit configured to perform interpolation of a lost pixel, the lost pixel being located at a region in which a plurality of contact image sensors are coupled, and the contact image sensors each being provided with a plurality of image reading elements that are arrayed in line, the image interpolating unit including:

a first interpolation pixel generator configured to generate, based on linear interpolation, a first pixel value on the lost pixel;

a second interpolation pixel generator configured to detect, based on a difference total value, reference pixels of the lost pixel, and generate, based on the reference pixels, a second pixel value on the lost pixel, the difference total value being a total of differences between pixel values corresponding to pixels in a pixel group that is centered around the lost pixel and pixel values corresponding to pixels in respective pixel groups that are centered around a single pixel around the lost pixel;

a reference pixel edge amount calculator configured to calculate edge amounts of the reference pixels; and an interpolator configured to insert, as an interpolation pixel value, one of the first pixel value and the second pixel value into a position corresponding to the lost pixel, based on the edge amounts of the reference pixels and a difference total value, the difference total value being a total of differences between pixel values corresponding to pixels in a pixel group that is centered around the reference pixels and the pixel values corresponding to the pixels in the pixel group that is centered around the lost pixel.

(2) The image interpolating unit according to (1), wherein the reference pixel edge amount calculator calculates the edge amounts of the reference pixels, based on differences between a pixel value corresponding to one of the reference pixels and each of pixel values corresponding to pixels that are adjacent to the one of the reference pixels.

(3) The image interpolating unit according to (1) or (2), wherein the interpolator determines the second pixel value as the interpolation pixel value when the difference total value, as the total of differences between the pixel values corresponding to the pixels in the pixel group that is centered around the reference pixels and the pixel values corresponding to the pixels in the pixel group that is centered around the lost pixel, is equal to or less than a first threshold value and the edge amounts are greater than a second threshold value, and otherwise determines the first pixel value as the interpolation pixel value.

(4) The image interpolating unit according to (1), wherein the second interpolation pixel generator includes:
 a standard pixel group extractor configured to extract the pixel group that is centered around the lost pixel;
 a search pixel group extractor configured to extract, as the pixel groups that are centered around the single pixel around the lost pixel, a first pixel group and a second pixel group, the first pixel group including pixels that are located in a region on left side of the lost pixel, and the second pixel group including pixels that are located in a region on right side of the lost pixel;
 a difference total value calculator configured to output a first difference total value and a second difference total value, the first difference total value being a total of differences between the pixel values corresponding to the pixels in the pixel group that is centered around the lost pixel and pixel values corresponding to the pixels in the first pixel group, and the second difference total value being a total of differences between the pixel values corresponding to the pixels in the pixel group that is centered around the lost pixel and pixel values corresponding to the pixels in the second pixel group; and
 an output selector configured to
  select, based on the first difference total value and the second difference total value, a smallest difference total value that is smallest in difference total value and output the smallest difference total value,
  output, as the reference pixels, a pixel located in middle of one of the pixel groups used upon determining the smallest difference total value and pixels adjacent to the pixel located in the middle, and
  output, as the second pixel value, the pixel located in the middle of the one of the pixel groups used upon determining the smallest difference total value.

(5) The image interpolating unit according to (4), wherein the reference pixel edge amount calculator calculates, as a first edge amount of the edge amounts, an absolute value of a difference between a pixel value corresponding to a pixel located in middle of the reference pixels and a pixel value corresponding to a pixel located on left side of the pixel located in the middle of the reference pixels, and calculates, as a second edge amount of the edge amounts, an absolute value of a difference between the pixel value corresponding to the pixel located in the middle of the reference pixels and a pixel value corresponding to a pixel located on right side of the pixel located in the middle of the reference pixels.

(6) The image interpolating unit according to (5), wherein
 the interpolator outputs, as the interpolation pixel value, the second pixel value when:
 (a) the smallest difference total value outputted from the output selector is equal to or less than a first threshold value that evaluates the smallest difference total value and the first edge amount is greater than a second threshold value that evaluates the first edge amount; or
 (b) the smallest difference total value outputted from the output selector is equal to or less than the first threshold value and the second edge amount is greater than a third threshold value that evaluates the second edge amount, and
 the interpolator outputs, as the interpolation pixel value, the first pixel value when both of the (a) and the (b) are unsatisfied.

(7) A recording medium having a machine-readable program embodied therein, the program causing, when executed by a machine, the machine to function as an image interpolating unit, the image interpolating unit being configured to perform interpolation of a lost pixel, the lost pixel being located at a region in which a plurality of contact image sensors are coupled, and the contact image sensors each being provided with a plurality of image reading elements that are arrayed in line, the image interpolating unit including:
 a first interpolation pixel generator configured to generate, based on linear interpolation, a first pixel value on the lost pixel;
 a second interpolation pixel generator configured to detect, based on a difference total value, reference pixels of the lost pixel, and generate, based on the reference pixels, a second pixel value on the lost pixel, the difference total value being a total of differences between pixel values corresponding to pixels in a pixel group that is centered around the lost pixel and pixel values corresponding to pixels in respective pixel groups that are centered around a single pixel around the lost pixel;
 a reference pixel edge amount calculator configured to calculate edge amounts of the reference pixels; and
 an interpolator configured to insert, as an interpolation pixel value, one of the first pixel value and the second pixel value into a position corresponding to the lost pixel, based on the edge amounts of the reference pixels and a difference total value, the difference total value being a total of differences between pixel values corresponding to pixels in a pixel group that is centered around the reference pixels and the pixel values corresponding to the pixels in the pixel group that is centered around the lost pixel.

(8) An image reading apparatus provided with an image interpolating unit, the image interpolating unit being configured to perform interpolation of a lost pixel, the lost pixel being located at a region in which a plurality of contact image sensors are coupled, the contact image sensors each being provided with a plurality of image reading elements that are arrayed in line, and the image interpolating unit performing the interpolation, based on pixel values read by the image reading elements, the image interpolating unit including:
 a first interpolation pixel generator configured to generate, based on linear interpolation, a first pixel value on the lost pixel;
 a second interpolation pixel generator configured to detect, based on a difference total value, reference pixels of the lost pixel, and generate, based on the reference pixels, a second pixel value on the lost pixel, the difference total value being a total of differences between pixel values corresponding to pixels in a pixel group that is centered around the lost pixel and pixel values corresponding to pixels in respective pixel groups that are centered around a single pixel around the lost pixel;
 a reference pixel edge amount calculator configured to calculate edge amounts of the reference pixels; and
 an interpolator configured to insert, as an interpolation pixel value, one of the first pixel value and the second pixel value into a position corresponding to the lost pixel, based on the edge amounts of the reference pixels and a difference total value, the difference total value being a total of differences between pixel values corresponding to pixels in a pixel group that is centered around the reference pixels and the pixel values corresponding to the pixels in the pixel group that is centered around the lost pixel.

Although the invention has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. An image interpolating unit configured to perform interpolation of a lost pixel, the lost pixel being located at a region in which a plurality of contact image sensors are coupled, and the contact image sensors each being provided with a plurality of image reading elements that are arrayed in line, the image interpolating unit comprising:
   a first interpolation pixel generator configured to generate, based on linear interpolation, a first pixel value on the lost pixel;
   a second interpolation pixel generator configured to detect, based on a difference total value, reference pixels of the lost pixel, and generate, based on the reference pixels, a second pixel value on the lost pixel, the difference total value being a total of differences between pixel values corresponding to pixels in a pixel group that is centered around the lost pixel and pixel values corresponding to pixels in respective pixel groups that are centered around a single pixel around the lost pixel;
   a reference pixel edge amount calculator configured to calculate edge amounts of the reference pixels; and
   an interpolator configured to insert, as an interpolation pixel value, one of the first pixel value and the second pixel value into a position corresponding to the lost pixel, based on the edge amounts of the reference pixels and a difference total value, the difference total value being a total of differences between pixel values corresponding to pixels in a pixel group that is centered around the reference pixels and the pixel values corresponding to the pixels in the pixel group that is centered around the lost pixel.

2. The image interpolating unit according to claim 1, wherein the reference pixel edge amount calculator calculates the edge amounts of the reference pixels, based on differences between a pixel value corresponding to one of the reference pixels and each of pixel values corresponding to pixels that are adjacent to the one of the reference pixels.

3. The image interpolating unit according to claim 1, wherein the interpolator determines the second pixel value as the interpolation pixel value when the difference total value, as the total of differences between the pixel values corresponding to the pixels in the pixel group that is centered around the reference pixels and the pixel values corresponding to the pixels in the pixel group that is centered around the lost pixel, is equal to or less than a first threshold value and the edge amounts are greater than a second threshold value, and otherwise determines the first pixel value as the interpolation pixel value.

4. The image interpolating unit according to claim 1, wherein the second interpolation pixel generator includes:
   a standard pixel group extractor configured to extract the pixel group that is centered around the lost pixel;
   a search pixel group extractor configured to extract, as the pixel groups that are centered around the single pixel around the lost pixel, a first pixel group and a second pixel group, the first pixel group including pixels that are located in a region on left side of the lost pixel, and the second pixel group including pixels that are located in a region on right side of the lost pixel;
   a difference total value calculator configured to output a first difference total value and a second difference total value, the first difference total value being a total of differences between the pixel values corresponding to the pixels in the pixel group that is centered around the lost pixel and pixel values corresponding to the pixels in the first pixel group, and the second difference total value being a total of differences between the pixel values corresponding to the pixels in the pixel group that is centered around the lost pixel and pixel values corresponding to the pixels in the second pixel group; and
   an output selector configured to
      select, based on the first difference total value and the second difference total value, a smallest difference total value that is smallest in difference total value and output the smallest difference total value,
      output, as the reference pixels, a pixel located in middle of one of the pixel groups used upon determining the smallest difference total value and pixels adjacent to the pixel located in the middle, and
      output, as the second pixel value, the pixel located in the middle of the one of the pixel groups used upon determining the smallest difference total value.

5. The image interpolating unit according to claim 4, wherein the reference pixel edge amount calculator calculates, as a first edge amount of the edge amounts, an absolute value of a difference between a pixel value corresponding to a pixel located in middle of the reference pixels and a pixel value corresponding to a pixel located on left side of the pixel located in the middle of the reference pixels, and calculates, as a second edge amount of the edge amounts, an absolute value of a difference between the pixel value corresponding to the pixel located in the middle of the reference pixels and a pixel value corresponding to a pixel located on right side of the pixel located in the middle of the reference pixels.

6. The image interpolating unit according to claim 5, wherein
   the interpolator outputs, as the interpolation pixel value, the second pixel value when:
   (a) the smallest difference total value outputted from the output selector is equal to or less than a first threshold value that evaluates the smallest difference total value and the first edge amount is greater than a second threshold value that evaluates the first edge amount; or (b) the smallest difference total value outputted from the output selector is equal to or less than the first threshold value and the second edge amount is greater than a third threshold value that evaluates the second edge amount, and the interpolator outputs, as the interpolation pixel value, the first pixel value when both of the (a) and the (b) are unsatisfied.

7. A non-transitory recording medium having a machine-readable program embodied therein, the program causing, when executed by a machine, the machine to function as an image interpolating unit, the image interpolating unit being configured to perform interpolation of a lost pixel, the lost pixel being located at a region in which a plurality of contact image sensors are coupled, and the contact image sensors each being provided with a plurality of image reading elements that are arrayed in line, the image interpolating unit comprising:

a first interpolation pixel generator configured to generate, based on linear interpolation, a first pixel value on the lost pixel;

a second interpolation pixel generator configured to detect, based on a difference total value, reference pixels of the lost pixel, and generate, based on the reference pixels, a second pixel value on the lost pixel, the difference total value being a total of differences between pixel values corresponding to pixels in a pixel group that is centered around the lost pixel and pixel values corresponding to pixels in respective pixel groups that are centered around a single pixel around the lost pixel;

a reference pixel edge amount calculator configured to calculate edge amounts of the reference pixels; and an interpolator configured to insert, as an interpolation pixel value, one of the first pixel value and the second pixel value into a position corresponding to the lost pixel, based on the edge amounts of the reference pixels and a difference total value, the difference total value being a total of differences between pixel values corresponding to pixels in a pixel group that is centered around the reference pixels and the pixel values corresponding to the pixels in the pixel group that is centered around the lost pixel.

8. An image reading apparatus provided with an image interpolating unit, the image interpolating unit being configured to perform interpolation of a lost pixel, the lost pixel being located at a region in which a plurality of contact image sensors are coupled, the contact image sensors each being provided with a plurality of image reading elements that are arrayed in line, and the image interpolating unit performing the interpolation, based on pixel values read by the image reading elements, the image interpolating unit comprising:

a first interpolation pixel generator configured to generate, based on linear interpolation, a first pixel value on the lost pixel;

a second interpolation pixel generator configured to detect, based on a difference total value, reference pixels of the lost pixel, and generate, based on the reference pixels, a second pixel value on the lost pixel, the difference total value being a total of differences between pixel values corresponding to pixels in a pixel group that is centered around the lost pixel and pixel values corresponding to pixels in respective pixel groups that are centered around a single pixel around the lost pixel;

a reference pixel edge amount calculator configured to calculate edge amounts of the reference pixels; and an interpolator configured to insert, as an interpolation pixel value, one of the first pixel value and the second pixel value into a position corresponding to the lost pixel, based on the edge amounts of the reference pixels and a difference total value, the difference total value being a total of differences between pixel values corresponding to pixels in a pixel group that is centered around the reference pixels and the pixel values corresponding to the pixels in the pixel group that is centered around the lost pixel.

\* \* \* \* \*